(12) United States Patent
Goodsitt et al.

(10) Patent No.: US 11,580,342 B2
(45) Date of Patent: *Feb. 14, 2023

(54) PAYMENT CARD WITH REMOVABLE INSERT AND IDENTIFICATION ELEMENTS

(71) Applicant: Capital One Services, LLC, McLean, VA (US)

(72) Inventors: Jeremy Goodsitt, Champaign, IL (US); Melissa A. Crawford, Arlington, VA (US); Micah Price, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,735

(22) Filed: Jan. 7, 2022

(65) Prior Publication Data

US 2022/0129717 A1 Apr. 28, 2022

Related U.S. Application Data

(63) Continuation of application No. 16/990,320, filed on Aug. 11, 2020, now Pat. No. 11,232,337.

(51) Int. Cl.
| | |
|---|---|
| *B42D 25/23* | (2014.01) |
| *G06K 19/00* | (2006.01) |
| *A45C 11/18* | (2006.01) |
| *B42D 25/45* | (2014.01) |
| *B42D 25/30* | (2014.01) |
| *B42D 25/20* | (2014.01) |

(52) U.S. Cl.
CPC .......... *G06K 19/005* (2013.01); *A45C 11/182* (2013.01); *B42D 25/20* (2014.10); *B42D 25/23* (2014.10); *B42D 25/30* (2014.10); *B42D 25/45* (2014.10)

(58) Field of Classification Search
CPC .......................... B42D 25/23; B42D 2033/42
USPC ....................................................... 283/904
See application file for complete search history.

(56) References Cited

U.S. PATENT DOCUMENTS

| | | | |
|---|---|---|---|
| 3,230,650 | A | 1/1966 | Orkin |
| 3,583,317 | A | 6/1971 | Gibson |
| 3,650,210 | A | 3/1972 | Archer |
| 4,511,796 | A | 4/1985 | Aigo |
| 5,096,228 | A | 3/1992 | Rinderknecht |
| 5,228,723 | A | 7/1993 | Hertig |
| 5,255,941 | A | 10/1993 | Solomon |
| 5,538,291 | A | 7/1996 | Gustafson |
| 5,620,335 | A | 4/1997 | Siemon |
| 5,700,037 | A | 12/1997 | Keller |

(Continued)

FOREIGN PATENT DOCUMENTS

| | | |
|---|---|---|
| WO | 2003/009220 A1 | 1/2003 |
| WO | 2014/074103 A1 | 5/2014 |
| WO | 2014/159693 A1 | 10/2014 |

*Primary Examiner* — Kyle R Grabowski
(74) *Attorney, Agent, or Firm* — Banner & Witcoff, Ltd.

(57) ABSTRACT

Aspects described herein may allow for a payment card assembly including a payment card having a first surface, an opposed second surface, and an aperture extending through the payment card from the first surface to the second surface. An insert may be removably received in the aperture. Each of a plurality of identification elements may be configured to be removably received in the aperture and have an identification characteristic different than an identification characteristic of each of the other identification elements.

20 Claims, 4 Drawing Sheets

(56) References Cited

U.S. PATENT DOCUMENTS

| | | |
|---|---|---|
| 5,818,030 A | 10/1998 | Reyes |
| 6,089,611 A | 7/2000 | Blank |
| 7,273,234 B1 | 9/2007 | Collins et al. |
| 2008/0000965 A1 | 1/2008 | Zellner et al. |
| 2009/0019751 A1 | 1/2009 | Goetting |
| 2010/0139138 A1 | 6/2010 | Miadich |
| 2012/0222787 A1 | 9/2012 | Caron |
| 2014/0076975 A1 | 3/2014 | Bellmyer et al. |
| 2014/0380229 A1 | 12/2014 | Volodin et al. |
| 2015/0278801 A1 | 10/2015 | Friedlander |
| 2017/0345234 A1 | 11/2017 | Getachew et al. |

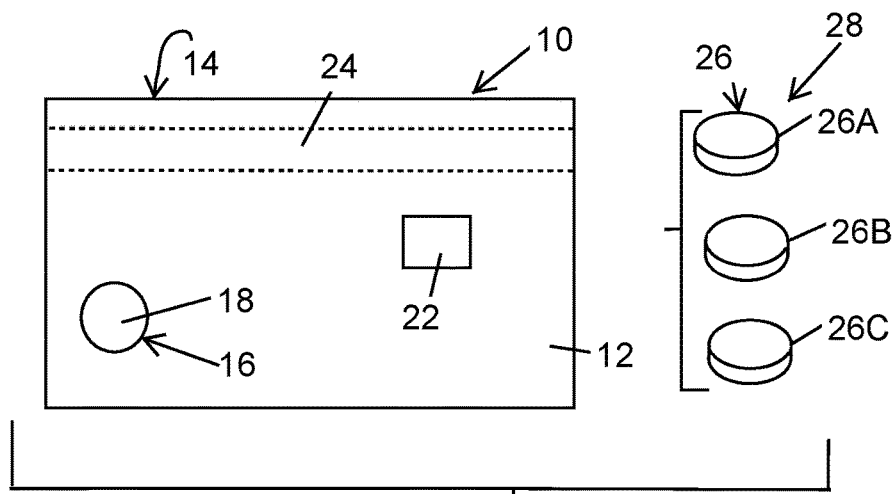
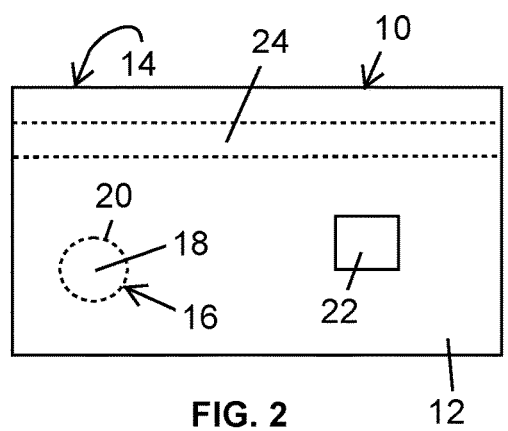
FIG. 1
FIG. 2
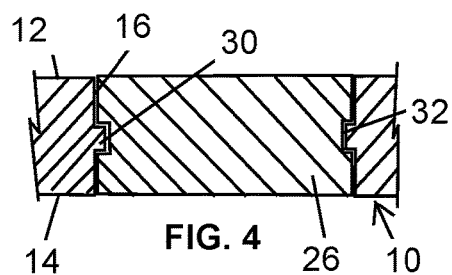
FIG. 4
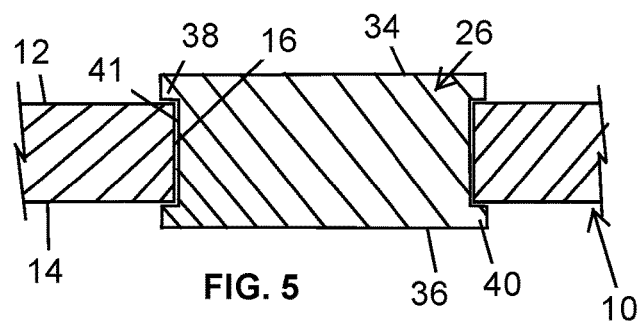
FIG. 5
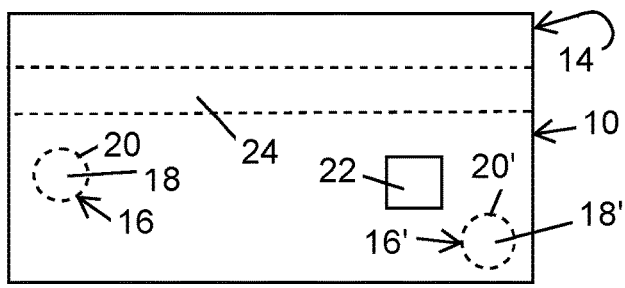
FIG. 3

US 11,580,342 B2

PAYMENT CARD WITH REMOVABLE INSERT AND IDENTIFICATION ELEMENTS

CROSS-REFERENCE TO RELATED APPLICATIONS

The instant application is a continuation of U.S. patent application Ser. No. 16/990,320, titled "Payment Card with Removable Insert and Identification Elements" filed Aug. 11, 2020, the disclosure of which is hereby incorporated by reference in its entirety.

FIELD OF USE

Aspects of the disclosure relate generally to a payment card with an insert and identification elements. More specifically, aspects of the disclosure may provide for a payment card having an insert removably received in an aperture, and identification elements removably received in the aperture.

BACKGROUND

Individuals often have multiple payment cards in their wallet, purse, or other carrying case, such as payment cards, e.g., credit cards, debit cards, and ATM cards. Distinguishing between different cards can be difficult at times, since many of the cards may have a similar appearance. Differentiating between a number of cards with similar appearances and background colors can be challenging.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a payment card assembly including a payment card having a first surface, an opposed second surface, and an aperture extending through the payment card from the first surface to the second surface. An insert may be removably received in the aperture. Each of a plurality of identification elements may be configured to be removably received in the aperture and have an identification characteristic different than an identification characteristic of each of the other identification elements.

In accordance with certain embodiments, a payment card assembly includes a payment card having a first surface and an opposed second surface, and a circular aperture extending through the payment card from the first surface to the second surface. Each of a first set of circular identification elements has a color different than a color of every other identification element of the first set. Each of a second set of circular identification elements has a shape different than a shape of every other identification element of the second set. Each of a third set of circular identification elements has a texture different than a texture of every other identification element of the third set. Each identification element is configured to be removably received in the aperture in snap-fit fashion.

In accordance with other aspects, a kit includes a payment card having a first surface, an opposed second surface, and a circular aperture extending through the payment card from the first surface to the second surface. A plurality of circular identification elements includes a first set of circular identification elements, with each identification element of the first set having a color different than a color of every other identification element of the first set. Each of a second set of circular identification elements has a shape different than a shape of every other identification element of the second set. Each identification element includes a first surface, an opposed second surface, a first flange extending about a periphery of the first surface, and a second flange extending about a periphery of the second surface. The first flanges are configured to extend along the first surface of the payment card and the second flanges are configured to extend along the second surface of the payment card when the identification elements are engaged with the payment card.

By using identification elements that are removably received in apertures in their payment cards, individuals can more readily identify and retrieve a desired card when the user's cards are stored in a wallet or purse. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 1 depicts a front plan view of an example of a payment card with a removable insert received in an aperture in the payment card, and a first set of identification elements;

FIG. 2 depicts a front plan view of an alternative embodiment of a payment card with a removable insert received in an aperture in the payment card;

FIG. 3 depicts a front plan view of an alternative embodiment of a payment card with multiple removable inserts received in apertures in the payment card;

FIG. 4 depicts a section view of an identification element removably received in the aperture in the payment card of FIG. 1;

FIG. 5 depicts a section view of an alternative embodiment of an identification element removably received in the aperture in the payment card of FIG. 1;

DETAILED DESCRIPTION

Figure 6:
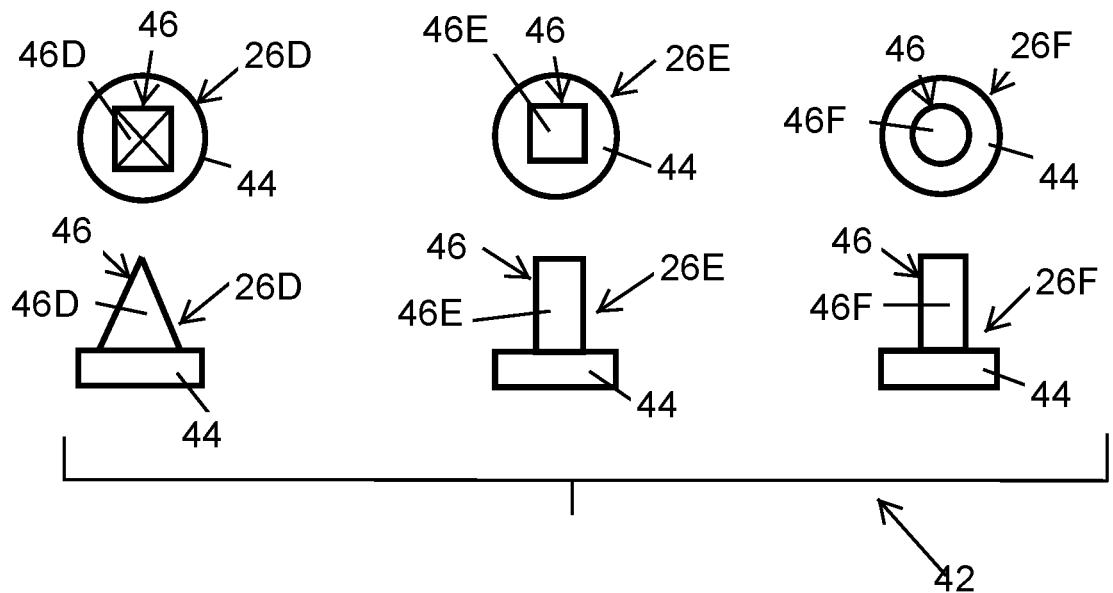
FIG. 6 depicts plan and elevation views of a second set of identification elements having different shapes and configured to be removably received in the aperture in the payment card of FIG. 1.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Embodiments discussed herein depict a payment card including identification elements having different identification characteristics that are removably received in an aperture in the payment card. By using identification elements having different identification characteristics, a user may be able to customize their payment card, allowing them to easily distinguish different payment cards from one another visually and/or by feel.

Embodiments of a card such as a payment card 10 are illustrated in FIGS. 1-2. Payment card 10 may be a payment card, such as credit card, a debit card, an ATM card, or a money access card ("MAC"), for example. It is to be appreciated that other types of cards that have a form factor similar to that of a payment card, such as business cards, membership cards, etc., are considered to be within the scope of the embodiments discussed herein and the claims.

Payment card 10 may include a first surface 12 and an opposed second surface 14. An aperture 16 may extend through payment card 10 from first surface 12 to second surface 14. In the illustrated embodiment, aperture 16 has a circular shape. It is to be appreciated that aperture may have any desired shape.

An insert 18 may be removably received in aperture 16. Insert 18 may be formed of the same material as payment card 10, e.g., a plastic resin such as polyvinyl chloride acetate (PVCA). In certain embodiments, payment card 10 may be formed of multiple layers of PVCA. In the illustrated embodiment, insert 18 has a circular shape. It is to be appreciated that insert 18 may have any desired shape that matches the shape of aperture 16.

In certain embodiments, insert 18 may be formed by creating a perforation line 20 in payment card, as seen in FIG. 2, which may allow insert 18 to be easily removed from payment card 10 by pushing insert 18 out of aperture 16.

A Europay, Mastercard, and Visa (EMV) chip 22 may be positioned on one of first side 12 and second side 14 of payment card 10. In the illustrated embodiment, EMV chip 22 is positioned on first side 12 of payment card 10. A magnetic strip 24 may also be positioned on payment card 10. Magnetic strip 24 may be positioned on first side 12 or on second side 14 of payment card 10, and may be positioned on the same side as EMV chip 22, or on the opposite side. In the illustrated embodiment, magnetic strip 24 is positioned on second side 14.

As seen in FIG. 1, a plurality of identification elements 26 may be provided, each of which may be removably received in aperture 16 after insert 18 has been removed from payment card 10. In certain embodiments, identification elements 26 may be received in aperture 16 in snap-fit fashion, allowing them to be easily inserted into and removed from aperture 16. In the illustrated embodiment, each identification element 26 has a circular shape. It is to be appreciated that each identification element 26 may have any desired shape that matches the shape of aperture 16.

In the illustrated embodiment, three identification elements 26A-C are provided in a first set 28. It is to be appreciated that any number of identification elements 26A-N may be provided in each of a plurality of sets. Each identification element 26A-C may have an identification characteristic different than an identification characteristic of each of the other identification elements 26A-C in first set 28. When a user selects a particular one of identification elements 26A-C and inserts it into aperture 16 of payment card 10, it may help the user recognize and distinguish that particular payment card 10 from other cards, including other payment cards, the user may be carrying in their wallet, purse, or other carrying case.

In certain embodiments, the identification characteristic used to distinguish between identification elements 26A-C in first set 28 may be a visual characteristic. For example, each of identification elements 26A-C may have a different color. The user may select one of identification elements 26A-C based on its color and insert that one identification element 26 into aperture 16. When the user later goes to use payment card 10, they may more easily recognize and distinguish payment card 10 from other payment cards they may be carrying in their wallet, purse, or other carrying case based on the color of the identification element 26 received in aperture 16 of payment card 10. In certain embodiments, the different colors for identification elements 26A-C could be provided by LED lights embedded within the identification elements 26A-C.

It is to be appreciated that while one of identification elements 26A-C may be inserted in aperture 16, a different one of identification elements 26A-C may be inserted in an aperture 16 of a different payment card 10.

Another embodiment of a payment card 10 is illustrated in FIG. 3, in which multiple apertures 16 are provided in payment card 10, and respective removable inserts 18 may be removably received in apertures 16. In the illustrated embodiment two apertures 16, 16' are provided in payment card 10, and two inserts 18, 18' are removably received in the apertures 16, 16'. It is to be appreciated that any number of apertures 16 and inserts 18 may be provided on payment card 10, allowing multiple ways for a user to customize the appearance of their payment card 10. A user may remove one or more of the multiple inserts 18 from the apertures 16 of payment card 10 in such embodiments, and replace them with desired identification elements 26.

As noted above, identification elements 26 may be removably received in aperture 16 in snap-fit fashion. In certain embodiments, as illustrated in FIG. 4, one of aperture 16 and identification element 26 may include a projection, and the other of aperture 16 and identification element 26 may include a mating recess configured to receive the projection, allowing identification element 26 to be removably received in aperture 16 in snap-fit fashion. In the illustrated embodiment, a projection 30 is formed on the surface of aperture 18, and a mating recess 32 is formed on identification element 26.

In certain embodiments, projection 30 may extend completely around an entire periphery of aperture 16, or an entire periphery of identification element 26 in embodiments where projection 30 is formed on identification element 26. In certain embodiments, projection 30 may extend around less than an entirety of the periphery of aperture 16 or identification element 26. Similarly, recess 32 may extend completely around an entire periphery of identification element 26, or an entire periphery of aperture 16 in embodiments where recess 32 is formed on aperture 16. In certain embodiments, recess 32 may extend around less than an entirety of the periphery of identification element 26 or aperture 16.

In another embodiment, as illustrated in FIG. 5, identification element 26 may include a first surface 34 and an opposed second surface 36. A first flange 38 may extend about a periphery of first surface 34, and a second flange 40 may extend about a periphery of second surface 36, defining a recess 41 therebetween. In this embodiment, when identification element 26 is inserted into aperture 16 in snap-fit fashion and engaged with payment card 10, first flange 38 extends along first surface 12 of payment card 10, and second flange 40 extends along second surface 14 of payment card 10 such that the periphery of aperture 16 is nested within recess 41.

It is to be appreciated that identification elements 26 can be removably received in aperture 16 through a variety of means that allow snap-fit engagement of identification elements 26 within aperture 16. Other suitable means for providing the snap-fit engagement of identification elements 26 within aperture 16 will become readily apparent to those skilled in the art, given the benefit of this disclosure.

As indicated above, a plurality of sets of identification elements 26 may be provided from which the user may select for insertion into aperture 16 for help in identifying payment card 10. A second set 42 of identification elements 26D-F is illustrated in FIG. 6. In the illustrated embodiment, each identification element 26D-F includes a first lower portion 44 and a second upper portion 46. Lower portion 44 may have a circular shape configured such that lower portion 44 may be removably received in aperture 16. It is to be appreciated that lower portion may have a different shape that that matches the shape of aperture 16.

In certain embodiments, lower portion 44 may have a recess 32 or projection 30, as described above with respect to FIG. 4, that mates with a corresponding projection 30 or recess 32 in aperture 16 to allow snap-fit engagement of lower portion 44 within aperture 16. In other embodiments, lower portion 44 may include a first flange 38 and a second flange 40, as described above with respect to FIG. 5, such that lower portion 44 may be engaged with aperture 16 in snap-fit fashion.

In second set 42, the identification characteristic used to distinguish between identification elements 26D-F may be a shape, which may provide both a visual and tactile indicator to the user for distinguishing payment card 10 from other payment cards. In the illustrated embodiment, the shape of upper each of upper portion 46D-F may be different than each of the other upper portions 46D-F. For example, upper portion 46D may have the shape of a pyramid, upper portion 46E may be a block with a rectangular cross-sectional shape, and upper portion 46F may have a cylindrical shape. Thus, when the user selects one of identification elements 26D-F and inserts it into aperture 16, the user can distinguish payment card 10 from other payment cards in the user's wallet, purse, or other carrying case based on the shape of the selected identification element 26, which the user may detect both visually and tactilely.

Figure 7:
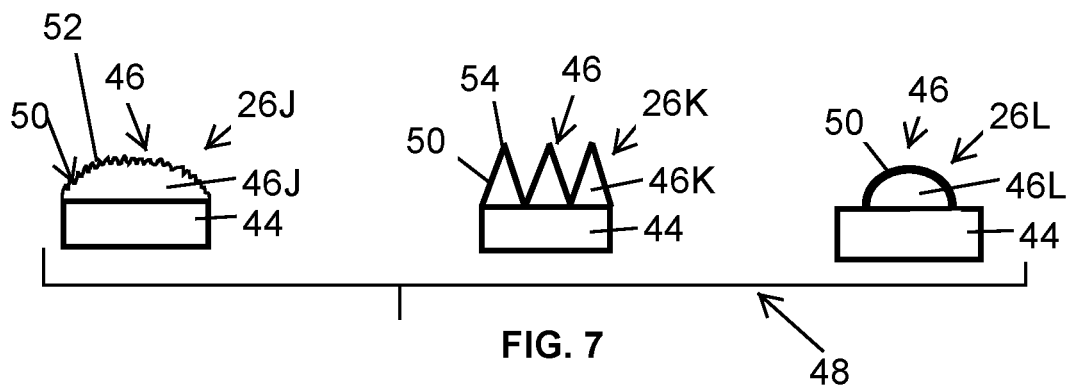
FIG. 7 depicts plan and elevation views of a second set of identification elements having different textures and configured to be removably received in the aperture in the payment card of FIG. 1.

A third set 48 of identification elements 26J-L is illustrated in FIG. 7. In the illustrated embodiment, each identification element 26J-L includes a first lower portion 44 and a second upper portion 46. Lower portion 44 may have a circular shape configured such that lower portion 44 may be removably received in aperture 16. It is to be appreciated that lower portion may have a different shape that that matches the shape of aperture 16.

In certain embodiments, lower portion 44 may have a recess 32 or projection 30, as described above with respect to FIG. 4, that mates with a corresponding projection 30 or recess 32 in aperture 16 to allow snap-fit engagement of lower portion 44 within aperture 16. In other embodiments, lower portion 44 may include a first flange 38 and a second flange 40, as described above with respect to FIG. 5, such that lower portion 44 may be engaged with aperture 16 in snap-fit fashion.

In third set 48, the identification characteristic used to distinguish between identification elements 26J-L may be a texture, which may provide both a visual and tactile indicator to the user for distinguishing payment card 10 from other payment cards. In the illustrated embodiment, the texture of upper each of upper portion 46J-L may be different than each of the other upper portions 46J-L. For example, upper portion 46J may have an irregular upper surface 50 including a plurality of projections or ribs 52, upper surface 50 of upper portion 46K may include a plurality of spikes 54, and upper portion 46L may have a dome shaped upper surface 50. Thus, when the user selects one of identification elements 26J-L and inserts it into aperture 16, the user can distinguish payment card 10 from other payment cards in the user's wallet, purse, or other carrying case based on the texture of the selected identification element 26, which the user may detect both visually and tactilely.

Figure 8:
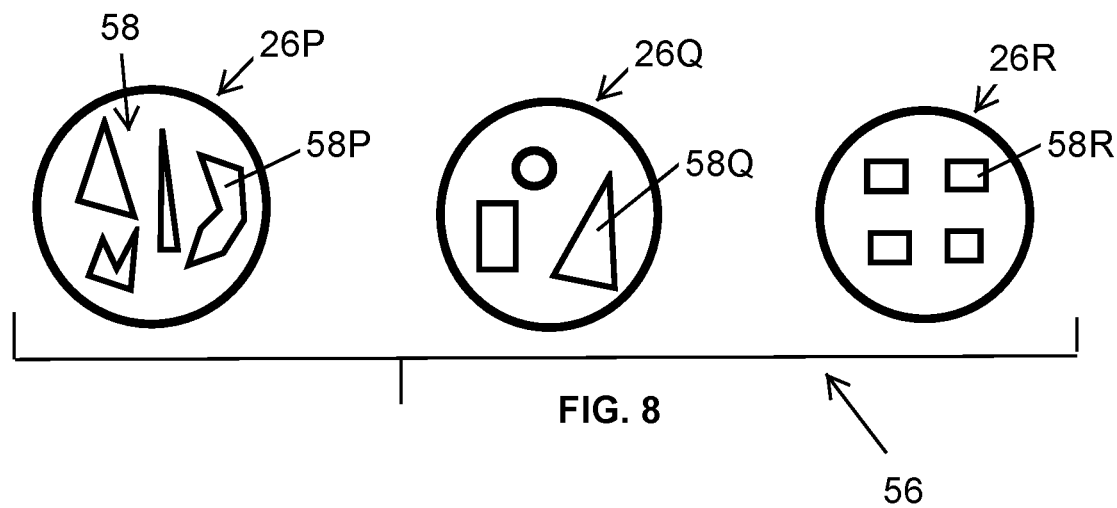
FIG. 8 depicts plan views of a fourth set of identification elements having different graphic elements and configured to be removably received in the aperture in the payment card of FIG. 1.

A fourth set 56 of identification elements 26P-R is illustrated in FIG. 8. In the illustrated embodiment, each identification element 26P-R may have a circular shape configured such that it may be removably received in aperture 16. It is to be appreciated that each identification element 26P-R may have a different shape that that matches the shape of aperture 16.

In certain embodiments, each identification element 26P-R may have a recess 32 or projection 30, as described above with respect to FIG. 4, that mates with a corresponding projection 30 or recess 32 in aperture 16 to allow snap-fit engagement of the respective identification element 26P-R within aperture 16. In other embodiments, each identification element 26P-R may include a first flange 38 and a second flange 40, as described above with respect to FIG. 5, such that each identification element 26P-R may be engaged with aperture 16 in snap-fit fashion.

In fourth set 56, the identification characteristic used to distinguish between identification elements 26P-R may be a graphic element 58, which may provide a visual indicator to the user for distinguishing payment card 10 from other payment cards. Thus, for example, identification element 26P could have a first graphic element 58P, identification element 26Q could have a second graphic element 58Q that is different than first graphic element 58P, and identification element 26R could have a third graphic element 58R that is different than both first graphic element 58P and second graphic element 58Q. By having a visually distinctive graphic element 58 on an identification element 26 inserted into aperture 16 of payment card 10, the user will be more easily able to distinguish the particular payment card 10 over other cards carried by the user in their wallet, purse, or other carrying case.

In certain embodiments, graphic element 58 could be created or altered by the user. For example, an identification element 26 could be provided to the user without a graphic element, and the user could create a graphic element 58 on the surface of identification element 26. In certain embodiments, the user could use a marker or paint, for example, to create a graphic element 58. In other embodiments, the user could take a previously created graphic element 58, e.g., a sticker, and adhere it to the surface of identification element 26. Other methods of positioning a user-created graphic element 58 on identification element 26 will become readily apparent to those skilled in the art, given the benefit of this disclosure.

Figure 9:
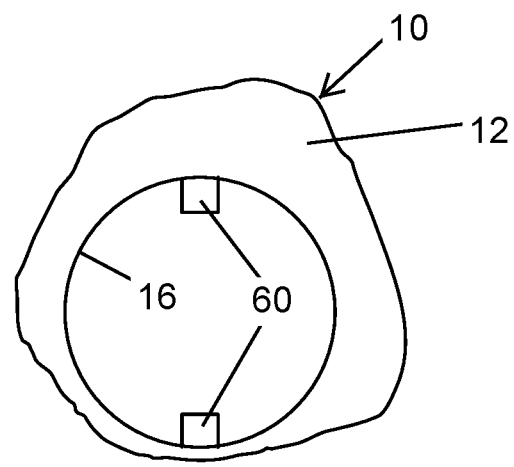
FIG. 9 depicts a plan view of a portion of an alternative embodiment of the payment card of FIG. 1, showing an aperture configured to removably receive an identification element.
Figure 10:
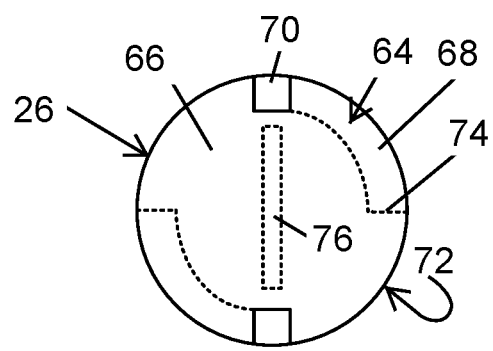
FIG. 10 depicts a plan view of an identification element to be received in the aperture of FIG. 9.

Another embodiment of an identification element 26 removably inserted into aperture 16 of payment card is illustrated in FIGS. 9-10. In this embodiment, a pair of opposed projections 60 are positioned about a periphery of aperture 16 and extend inwardly toward the center of aperture 16, as seen in FIG. 9. Identification element 26 may include a pair of opposed arc-shaped recesses 64 formed on a bottom surface 66 of identification element 26. Each recess 64 may include a cover 68 that extends along only a portion of recess 64, and defines an opening 70 on bottom surface 66 that exposes that portion of recess 64 defined by opening 70 to an exterior of identification element 26.

To insert identification element 26 into aperture 16, identification element 26 is positioned over aperture 16 with bottom surface 66 facing downwards, and an opposed top surface 72 of identification element 26 facing upwards. Projections 60 on payment card 10 are then received in openings 70 and identification element 26 may then be turned a quarter revolution until projections 60 abut respective ends 74 of recesses 64 such that projections 60 are received in recesses 64 beneath covers 68. In certain embodiments, a slot 76 may be formed in top surface 72, which may be configured to receive an edge of a coin or other tool, such as a screwdriver, helping the user rotate identification element 26 to its proper position within aperture 16. It is to be appreciated that in other embodiments, projections 60 may be formed on identification element 26 and that mating recesses 64 may be formed in payment card 10.

Figure 11:
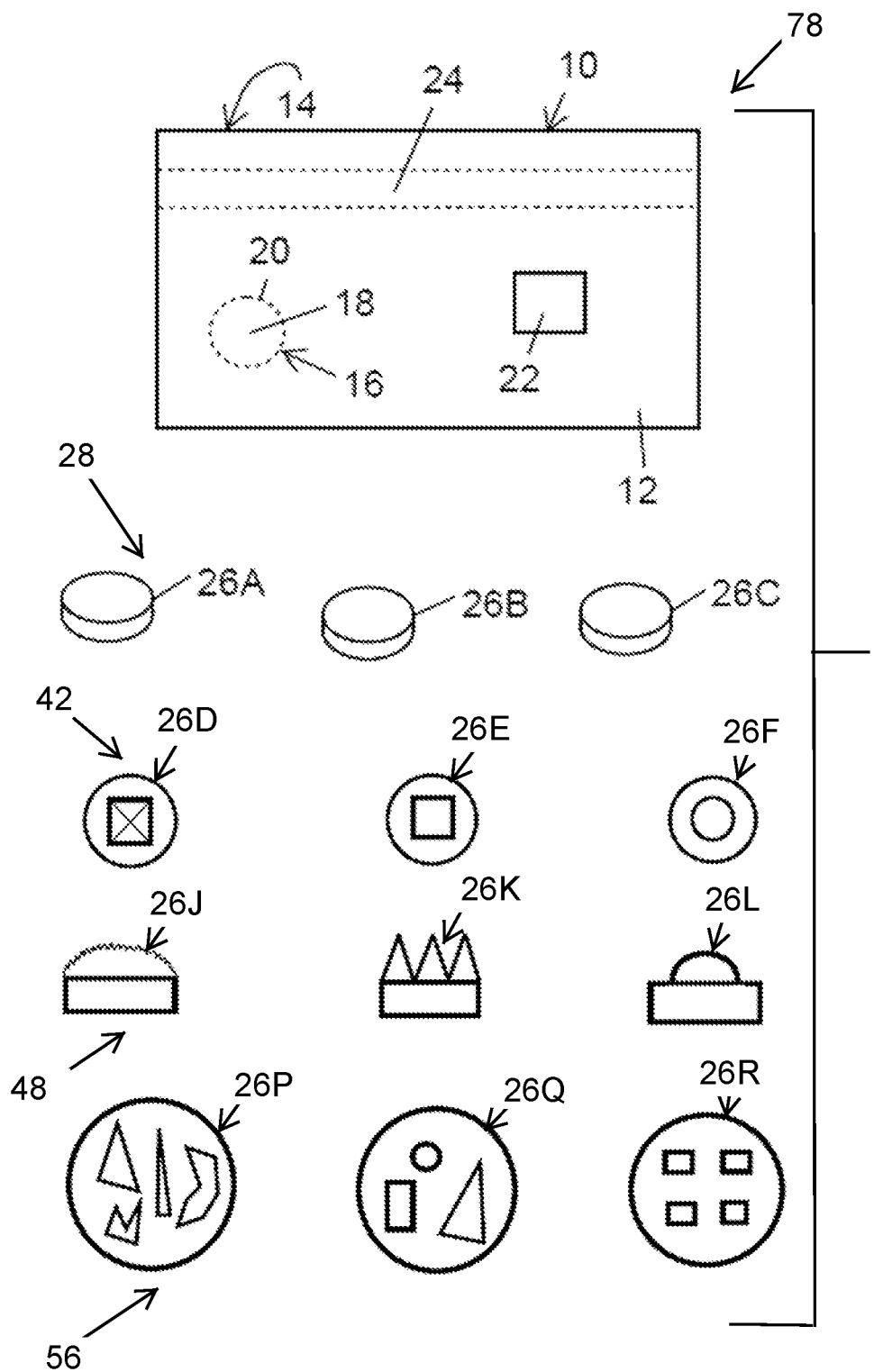
FIG. 11 depicts a kit including the payment card of FIG. 1, and a plurality of sets of identification elements.

A kit 78 including a payment card 10 to be modified with an identification element 26 is illustrated in FIG. 11. A plurality of identification elements 26 may be included with kit 78, allowing the user to select a desired identification element 26 to be inserted into aperture 16. In the illustrated embodiment, kit 78 may include first set 28 of identification elements 26A-C, second set 42 of 28 of identification elements 26D-F, third set 48 of identification elements 26J-L, and fourth set 56 of identification elements 26P-R. Each of identification elements 26A-C of first set 28 may have a color different than a color of every other identification element 26A-C of first set 28. Each of identification elements 26D-F of second set 42 may have a shape different than a shape of every other identification element 26D-F of second set 42. Each of identification elements 26J-L of third set 48 may have a texture different than a texture of every other identification element 26J-L of third set 48. Each of identification elements 26P-R of fourth set 56 may have a graphic element different than a graphic element of every other identification element 26P-R of third set 56.

With kit 78 a user is provided with a large number of options for creating a distinct payment card 10 that is easily distinguished from other payment cards in the user's wallet, purse, or other carrying case. It is to be appreciated that the number of identification elements 26 in each of first set 28, second set 42, third set 48, and fourth set 56 is not limited to three identification elements. Additionally, kit 78 may be provided with more than four sets of identification elements having different identification characteristics.

In certain embodiments, each identification element 26 of first set 28, second set 42, third set 48, and fourth set 56 may have a recess 32 or projection 30, as described above with respect to FIG. 4, that mates with a corresponding projection 30 or recess 32 in aperture 16 to allow snap-fit engagement of the respective identification element 26 within aperture 16. In other embodiments, each identification element 26 of first set 28, second set 42, third set 48, and fourth set 56 may include a first flange 38 and a second flange 40, as described above with respect to FIG. 5, such that each identification element 26 may be engaged with aperture 16 in snap-fit fashion.

In addition to inserting any identification element 26 of first set 28, second set 42, third set 48, and fourth set 56 of kit 78 into aperture 16 of payment card 10, one or more other identification element 26 of first set 28, second set 42, third set 48, and fourth set 56 of kit 78 may be inserted into respective apertures 16 of other payment cards 10, allowing a plurality of payment cards 10 of a user to be easily identified in the user's wallet, purse, or other carrying case.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A payment card assembly comprising:
   a payment card having a first surface and an opposed second surface;
   a Europay, Mastercard, and Visa (EMV) chip positioned on the payment card;
   an aperture extending through the payment card from the first surface to the second surface;
   an insert removably received in the aperture; and
   a plurality of identification elements, each identification element being configured to be removably received in the aperture and having an identification characteristic different than an identification characteristic of each of the other identification elements.

2. The payment card assembly of claim 1, wherein the insert and the identification elements are removably received in the aperture in snap-fit fashion.

3. The payment card assembly of claim 1, wherein one of the aperture and a peripheral surface of each of the identification elements includes a projection, and the other of the aperture and the peripheral surface of each of the identification elements includes a recess configured to receive the projection.

4. The payment card assembly of claim 1, wherein each identification element includes a first surface, an opposed second surface, a first flange extending about a periphery of the first surface, and a second flange extending about a periphery of the second surface, the first flange extending along the first surface of the payment card and the second flange extending along the second surface of the payment card when the each identification element is engaged with the payment card.

5. The payment card assembly of claim 1, wherein the identification characteristic is visual.

6. The payment card assembly of claim 1, wherein the identification characteristic is a shape.

7. The payment card assembly of claim 1, wherein the identification characteristic is a texture.

8. The payment card assembly of claim 1, wherein at least one identification element is alterable by a user.

9. The payment card assembly of claim 1, wherein
   the payment card includes a pair of opposed projections positioned about a periphery of the aperture, each identification element includes a pair of opposed recesses, and each identification element is configured to be removably secured within the aperture upon being turned a quarter revolution such that each of the projections is received in one of the recesses.

10. The payment card assembly of claim 1, wherein the plurality of identification elements includes a first set of identification elements, a second set of identification elements, and a third set of identification elements, each identification element of the first set having a color different than a color of every other identification element of the first set, each identification element of the second set having a shape different than a shape of every other identification element of the second set, and each identification element of the third set having a texture different than a texture of every other identification element of the third set.

11. The payment card assembly of claim 10, wherein the color of the first, second, and third set of identification elements is provided by LED lights embedded in the first, second, and third set of identification elements.

12. The payment card assembly of claim 1, further comprising an additional aperture extending through the payment card from the first surface to the second surface, each identification element being configured to be removably received in the additional aperture.

13. A card assembly comprising:
a card having a first surface and an opposed second surface;
a Europay, Mastercard, and Visa (EMV) chip positioned on the card;
a circular aperture extending through the card from the first surface to the second surface;
a first set of circular identification elements, each identification element of the first set having a color different than a color of every other identification element of the first set;
a second set of circular identification elements, each identification element of the second set having a shape different than a shape of every other identification element of the second set; and
a third set of circular identification elements, each identification element of the third set having a texture different than a texture of every other identification element of the third set,
wherein each identification element is configured to be removably received in the aperture in snap-fit fashion.

14. The card assembly of claim 13, further comprising a fourth set of circular identification elements, each identification element of the fourth set having a graphic element different than a graphic element of every other identification element of the fourth set.

15. The card assembly of claim 13, wherein one of the aperture and a peripheral surface of each of the identification elements includes a projection, and the other of the aperture and the peripheral surface of each of the identification elements includes a recess configured to receive the projection.

16. The card assembly of claim 15, wherein the projection extends about an entire periphery of the one of the aperture and the peripheral surface of each of the identification elements, and the recess extends about an entire periphery of the other of the aperture and the peripheral surface of each of the identification elements.

17. The card assembly of claim 13, wherein each identification element includes a first surface, an opposed second surface, a first flange extending about a periphery of the first surface, and a second flange extending about a periphery of the second surface, the first flange extending along the first surface of the card and the second flange extending along the second surface of the card when the each identification element is engaged with the card.

18. A kit comprising:
a card having a first surface and an opposed second surface;
a Europay, Mastercard, and Visa (EMV) chip positioned on the card;
a circular aperture extending through the card from the first surface to the second surface;
a plurality of circular identification elements;
a first set of circular identification elements, each identification element of the first set having a color different than a color of every other identification element of the first set; and
a second set of circular identification elements, each identification element of the second set having a shape different than a shape of every other identification element of the second set,
wherein each identification element includes a first surface, an opposed second surface, a first flange extending about a periphery of the first surface, and a second flange extending about a periphery of the second surface, and
wherein the first flanges are configured to extend along the first surface of the card and the second flanges are configured to extend along the second surface of the card when the identification elements are engaged with the card.

19. The kit of claim 18, further comprising a third set of circular identification elements, each identification element of the third set having a texture different than a texture of every other identification element of the third set.

20. The kit of claim 18, further comprising a fourth set of circular identification elements, each identification element of the fourth set having a graphic element different than a graphic element of every other identification element of the fourth set.

* * * * *